US011951378B2

(12) United States Patent
Ziyan et al.

(10) Patent No.: US 11,951,378 B2
(45) Date of Patent: Apr. 9, 2024

(54) SKI HOLDER FOR WAXING AND EDGE TRIMMING

(71) Applicant: Xiamen Chixue Sports Goods Co., Ltd., Xiamen (CN)

(72) Inventors: Pu Ziyan, Xiamen (CN); Xu Jianjun, Xiamen (CN)

(73) Assignee: Xiamen Chixue Sports Goods Co., Ltd.

( * ) Notice: Subject to any disclaimer, the term of this patent is extended or adjusted under 35 U.S.C. 154(b) by 0 days.

(21) Appl. No.: 18/088,824

(22) Filed: Dec. 27, 2022

(65) Prior Publication Data

US 2023/0293970 A1 Sep. 21, 2023

(30) Foreign Application Priority Data

Mar. 18, 2022 (CN) ........................ 202220605914.0

(51) Int. Cl.
*A63C 11/08* (2006.01)
*A63C 11/14* (2006.01)
*B25B 1/10* (2006.01)

(52) U.S. Cl.
CPC .............. *A63C 11/08* (2013.01); *A63C 11/14* (2013.01); *B25B 1/10* (2013.01)

(58) Field of Classification Search
CPC ........... B25B 1/10; A63C 11/04; A63C 11/06; A63C 11/08; A63C 11/14
See application file for complete search history.

(56) References Cited

U.S. PATENT DOCUMENTS 2,636,527 A * 4/1953 Schiemann ............. B25B 5/003 269/45
3,826,482 A * 7/1974 Tourangeau ........... A63C 11/04 269/88
3,854,712 A * 12/1974 McGee .................. B25B 5/003 269/275

(Continued)

*Primary Examiner* — Jeffrey J Restifo
(74) *Attorney, Agent, or Firm* — Jose Cherson Weissbrot

(57) ABSTRACT

The present utility model belongs to the field of repair and maintenance of sporting goods, and particularly to a ski holder for waxing and edge trimming which includes a holder body, a fixing member, and a fastening member. The holder body is provided with placement positions for placing a ski and a fixing position for fixing the holder body; the holder body further includes a movable piece, the movable piece is arranged between adjacent placement positions, and the movable piece can move toward the placement positions on both sides thereof. One end of the fixing member passes through the holder body and is exposed at the fixing position, and the fixing member is moved to cooperate with the fixing position to fix the holder body. One end of the fastening member passes through the holder body and is exposed at the first placement position, and the fastening member is moved to cooperate with the placement position to fasten the ski. In the present utility model, the ski in any placement position can be fixed through the short-stroke movement of the fastening member, thereby realizing quick fastening of snowboard and ski. The ski holder provides three placement modes of vertical placement, inclined placement, and horizontal placement, facilitating the maintenance of ski including waxing and edge trimming.

8 Claims, 6 Drawing Sheets

(56) References Cited

U.S. PATENT DOCUMENTS

| | | | | | | |
|---|---|---|---|---|---|---|
| 3,921,967 | A | * | 11/1975 | Campbell | B25B 1/20 | 269/219 |
| 3,963,234 | A | * | 6/1976 | Bejtlich | A63C 11/08 | 269/296 |
| 3,977,663 | A | * | 8/1976 | Kohler | B25B 5/003 | 269/153 |
| D245,475 | S | * | 8/1977 | Bourgeois | D8/72 | |
| 4,048,700 | A | * | 9/1977 | Browne | B60R 9/12 | 224/318 |
| 4,050,685 | A | * | 9/1977 | Cox | B25B 5/14 | 269/88 |
| 4,066,250 | A | * | 1/1978 | Campbell | B25B 1/103 | 269/166 |
| 4,078,780 | A | * | 3/1978 | Schwarz | A63C 11/04 | 269/88 |
| 4,081,180 | A | * | 3/1978 | Munn | B25B 1/20 | 269/88 |
| 4,175,736 | A | * | 11/1979 | Dietlein | A63C 11/04 | 269/88 |
| 4,262,890 | A | * | 4/1981 | Sisko | A63C 11/08 | 248/205.8 |
| 4,382,588 | A | * | 5/1983 | Vovk | B60R 9/12 | 269/95 |
| 4,592,541 | A | * | 6/1986 | Huray | B25B 5/003 | 269/155 |
| 5,150,887 | A | * | 9/1992 | Weissenborn | A63C 11/14 | 269/301 |
| 5,236,183 | A | * | 8/1993 | Curtis | B25B 5/14 | 269/82 |
| 5,485,988 | A | * | 1/1996 | Nobilec | A63C 11/26 | 269/21 |
| 5,497,982 | A | * | 3/1996 | Stoltz | A63C 11/04 | 269/71 |
| 5,709,373 | A | * | 1/1998 | Wasylynko | B25H 1/06 | 269/69 |
| 5,848,783 | A | * | 12/1998 | Weissenborn | B25B 5/14 | 269/236 |
| 5,893,550 | A | * | 4/1999 | Lassley | A63C 11/06 | 269/21 |
| 6,067,880 | A | * | 5/2000 | Arrigoni | A63C 3/10 | 76/82 |
| 6,260,441 | B1 | * | 7/2001 | Landl | B23D 67/12 | 76/83 |
| 6,386,068 | B1 | * | 5/2002 | Weissenborn | A63C 11/06 | 76/83 |
| 6,405,615 | B1 | * | 6/2002 | Vermillion | A63C 11/04 | 407/29.15 |
| 6,663,094 | B2 | * | 12/2003 | Weissenborn | A63C 11/26 | 269/131 |
| 7,690,631 | B2 | * | 4/2010 | Rathjen | A63C 11/14 | 269/296 |
| D949,772 | S | * | 4/2022 | Zheng | D12/406 | |
| 2002/0035894 | A1 | * | 3/2002 | Weissenborn | A63C 11/06 | 76/83 |
| 2003/0042663 | A1 | * | 3/2003 | Baud | B25H 1/12 | 269/296 |
| 2010/0164158 | A1 | * | 7/2010 | Weissenborn | A63C 11/26 | 269/282 |
| 2012/0119427 | A1 | * | 5/2012 | Weissenborn | A63C 11/04 | 269/95 |
| 2023/0293970 | A1 | * | 9/2023 | Ziyan | A63C 11/08 | 280/809 |

* cited by examiner

SKI HOLDER FOR WAXING AND EDGE TRIMMING

TECHNICAL FIELD

The present utility model relates to the field of repair and maintenance of sporting goods, and particularly to a ski holder for waxing and edge trimming.

BACKGROUND

With the success of the Beijing Winter Olympics, skiing has gradually entered the field of vision of more people and become increasingly popularized. In skiing, the skis are the most important equipment, so the maintenance of the skis is crucial.

At present, ski holders (vises) available on the market cannot quickly fix a ski, involve too long operating stroke, and are unable to hold the ski at multiple angles.

In this regard, how to improve the convenience of using a ski fixing holder is a technical problem to be solved in the art.

SUMMARY

The purpose of the present utility model is to provide an easy-to-clamp ski holder for waxing and edge trimming.

The present utility model aims at solving the problem that the existing ski holder is not convenient enough to fix a ski.

To solve the above-mentioned problem, the present utility model is implemented through the following technical solutions:

A ski holder for waxing and edge trimming, including:

a holder body, wherein the holder body is provided with placement positions for placing a ski and a fixing position for fixing the holder body; the holder body also includes a movable piece, the movable piece is arranged between adjacent placement positions, and the movable piece can move toward the placement positions on both sides thereof;

a fixing member, wherein one end of the fixing member passes through the holder body and is exposed at the fixing position, and the fixing member is moved to cooperate with the fixing position to fix the holder body; and a fastening member, wherein one end of the fastening member passes through the holder body and is exposed at the first placement position, and the fastening member is moved to cooperate with the placement position to fasten the ski.

Further, the placement positions each are a clamping groove formed on the holder body by an upper end face of the holder body facing downward.

Further, two placement positions are provided, including a vertical position and an inclined position. One end of the fixing member is exposed at the vertical position.

Further, the movable piece is movably arranged on the holder body through a rotating shaft, or, the movable piece is slidably arranged on the holder body.

Further, two placement positions are provided. The cross section of the movable piece along the moving direction of the fastening member is a right-angled triangle with the hypotenuse facing the inclined position.

Further, an upper end face of the holder body is flat.

Further, the upper end face of the holder body is provided with an anti-slip silicone or an anti-slip rubber.

Further, the fixing position is formed by a side edge of the holder body concaving inwardly.

Further, the fixing member includes a fixing screw passing through the holder body and exposed at the fixing position, a fixing abutting joint located at one end of the fixing screw facing the fixing position, and a fixing handle located at the other end of the fixing screw. The end of the fixing abutting joint away from the fixing handle is flat.

Further, the fastening member includes a fastening screw passing through the holder body and exposed at the first placement position, a fastening abutting joint located at the end of the fastening screw facing the placement position, and a rotating handle located at the end of the fastening screw away from the placement position. The end of the fastening abutting joint away from the rotating handle is flat.

Compared with the prior art, the technical solutions of the present utility model have the following advantages:

(1) In the holder of the present utility model, the movable piece is movably arranged between adjacent placement positions, so that the ski in any placement position can be fixed through the short-stroke movement of the fastening member, thereby realizing quick fastening of the ski.

(2) The holder of the present utility model provides three placement modes of vertical placement, inclined placement, and horizontal placement, which is more convenient for daily maintenance and repair of the ski.

ILLUSTRATION DESCRIPTION ski—1;

holder body—100; placement position—110; vertical position—111; inclined position—112; recessed position—113; fixing position—120; movable piece—130; cathetus face 131; hypotenuse face—132; rotating shaft—140;

fixing member—200; fixing abutting joint—210; fixing screw—220; fixing handle—230;

fastening member—300; fastening abutting joint—310; fastening screw—320;

rotating handle—330;

anti-slip silicone—400.

DETAILED DESCRIPTION OF THE EMBODIMENTS

In order to make the purposes, technical solutions, and advantages of the embodiments of the present utility model clearer, the technical solutions in the embodiments of the present utility model will be clearly and completely described below with reference to the accompanying drawings in the embodiments of the present utility model. Apparently, the embodiments described are a part of the embodiments of the present utility model, rather than all of the embodiments. It should be understood that the specific embodiments described herein are only used to explain the present utility model, and are not used to limit the present utility model. All other embodiments obtained based on the embodiments of the present utility model by those of ordinary skill in the art without creative work fall within the protection scope of the present utility model.

Figure 1:
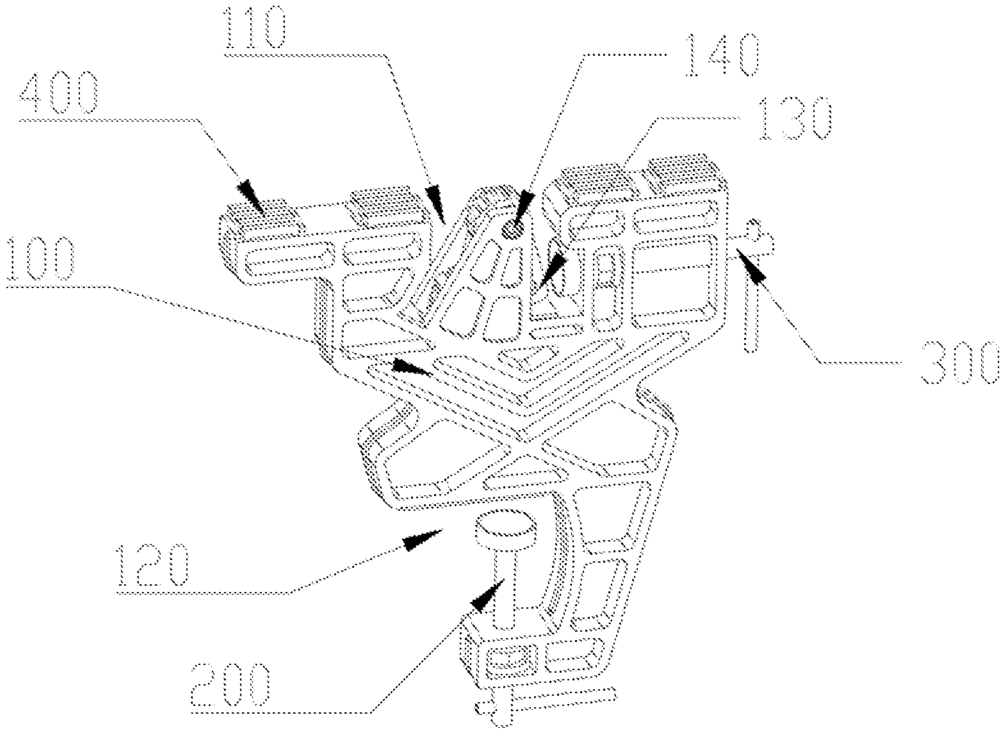
FIG. 1 is a perspective view of the ski holder for waxing and edge trimming provided by an embodiment of the present utility model.
Figure 2:
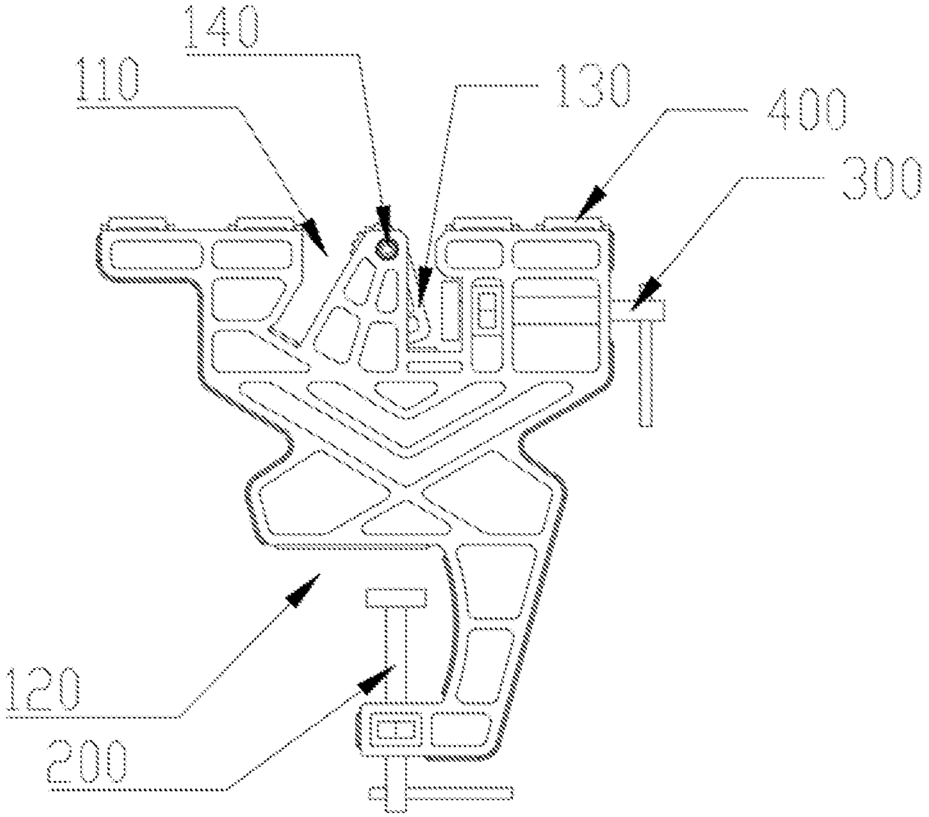
FIG. 2 is a front view of the ski holder for waxing and edge trimming provided by an embodiment of the present utility model.

Referring to FIG. 1 and FIG. 2, a ski holder for waxing and edge trimming includes a holder body 100, a fixing member 200, and a fastening member 300. The holder body 100 is provided with placement positions 110 for placing a ski, a fixing position 120 for fixing the holder body 100, and a movable piece 130. The movable piece 130 is arranged between adjacent placement positions 110, and the movable piece 130 can move toward the placement positions 130 located on both sides thereof. That is, the movable piece 130 can be partially exposed at the placement position located on one side thereof and/or partially exposed at the placement position located on the other side thereof.

One end of the fixing member 200 passes through the holder body 1 and is exposed at the fixing position 120. The fixing member 200 cooperates with the fixing position 120 to fix the holder body 100. One end of the fastening member 300 passes through the holder body 100 and is exposed at the first placement position 110. The fastening member 300 cooperates with the placement position 110 to fasten the ski.

Use process: The holder body is fixed on a desktop by the fixing member and the fixing position, and then the ski is placed in any placement position 110. If the ski is placed in the placement position 110 close to the fastening member, the fastening member 300 is moved to cooperate with the side wall of the placement position 110 to collectively limit and fix the ski. At this time, the movable piece 130 is pushed by the ski to another placement position 130. If the ski is placed in the placement position 110 farther from the fastening member 300, the fastening member 300 is moved to push the first movable piece 130 to the second placement position 130, the first movable piece 130 then pushes the second movable piece to the third placement position 130, and so on, until the Nth movable piece cooperates with the side wall of the N+1th placement position to collectively limit and fix the ski placed in the placement position.

Therefore, when a plurality of placement positions 110 are provided on the holder body 100, the ski in any placement position 110 can be fastened by moving the fastening member 300, which effectively shortens the moving stroke of the fastening member, can also fix the skis in multiple placement positions at the same time, and is suitable for the fixation of the skis of different thicknesses. The movable piece here can be hinged at one end and move in a fan-shaped stroke. Alternatively, the movable piece can be a slide block sliding along the axis direction of the placement position in a straight stroke. In the present embodiment, the structure provided with two placement positions 110 is only used as an example for description, the principle of which is the same as that provided with multiple placement positions.

Figure 3:
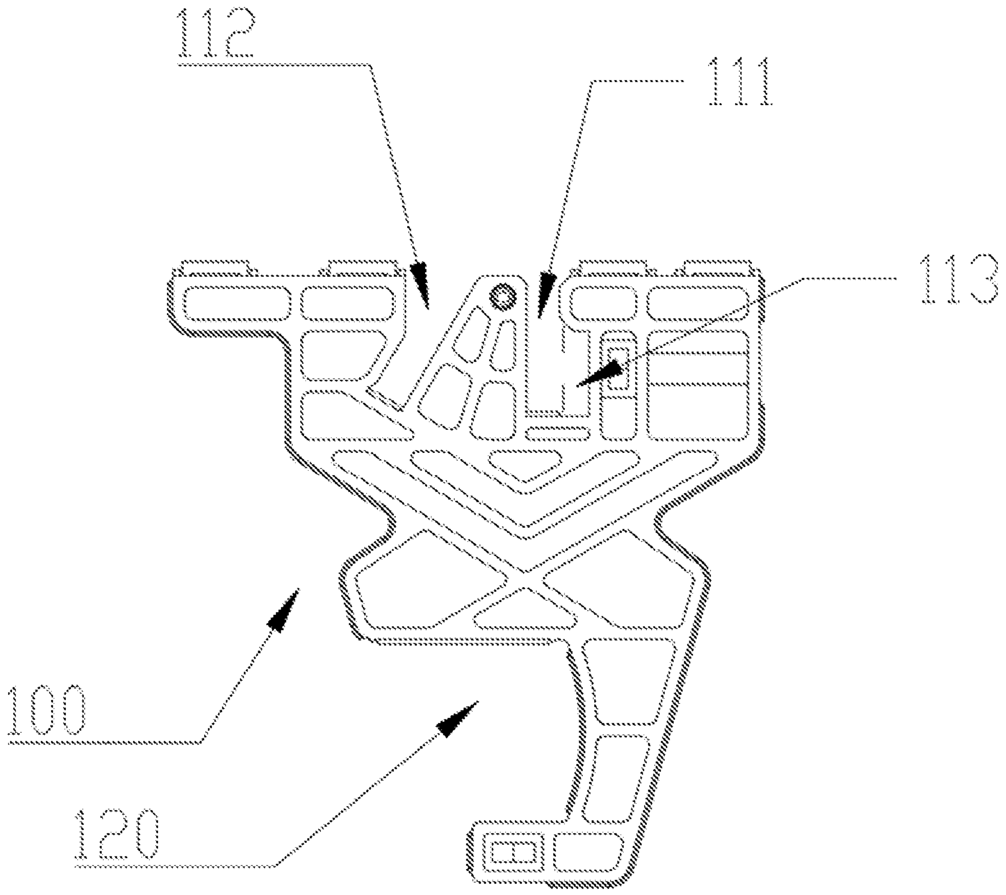
FIG. 3 is a structural diagram showing the holder body of the ski holder for waxing and edge trimming provided by an embodiment of the present utility model, with the movable piece being removed.

Referring to FIG. 3, the placement position 110 is a clamping groove formed on the holder body by the upper end face of the holder body 100 facing downward. The placement position 110 includes a vertical position 111 close to the fastening member 300 and an inclined position 112 away from the fastening member 300, such that the holder allows the ski to be placed vertically or obliquely, providing more convenience for the maintenance of the ski. Further, the upper end face of the holder body 100 is flat and provided with an anti-slip silicone 400 or an anti-slip rubber, so that the ski can also be placed flat.

Figure 4:
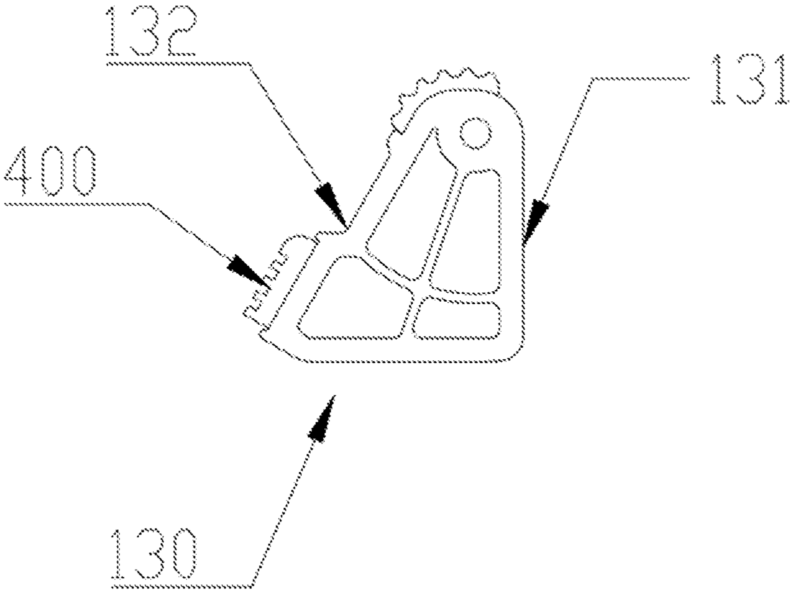
FIG. 4 is a structural diagram of the movable piece provided by an embodiment of the present utility model.

Referring to FIG. 4, in the present embodiment, the movable piece 130 is movably arranged at the upper end of the holder body 100 through a rotating shaft 140, that is, the movement trajectory of the movable piece 130 is fan-shaped. The cross section of the movable piece 130 along the moving direction of the fastening member 300 is a right-angled triangle with the hypotenuse facing the inclined position 112. In other words, the movable piece 130 includes a cathetus face 131 facing the vertical position 111 and a hypotenuse face 132 facing the inclined position 112.

Figure 5:
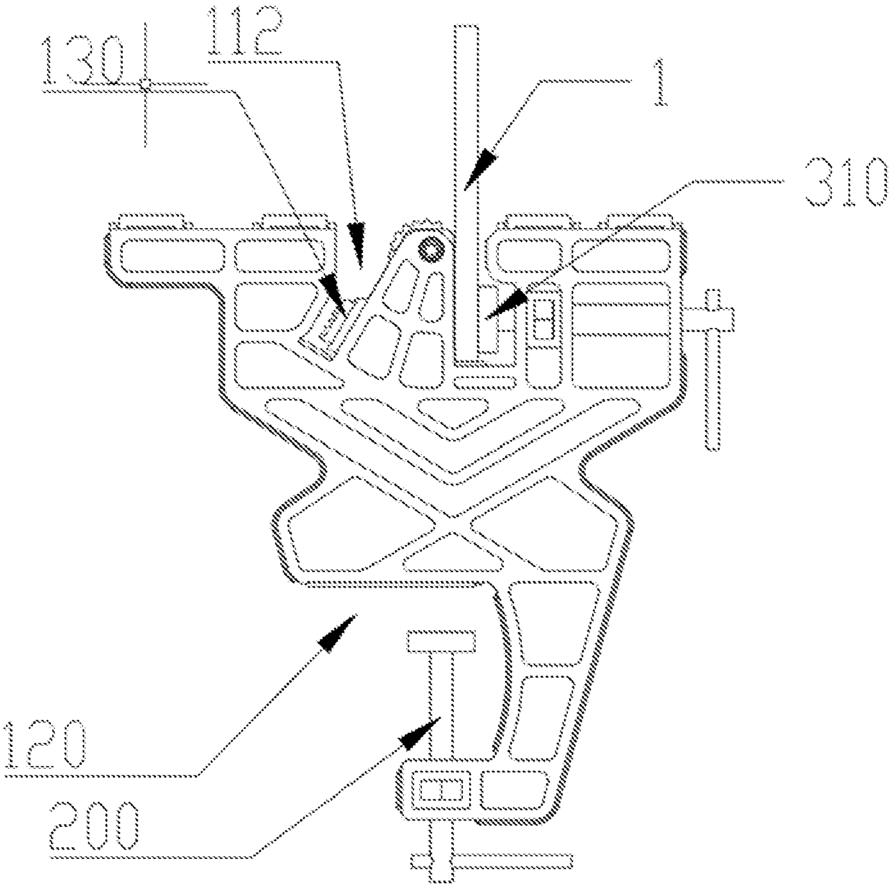
FIG. 5 is a diagram showing a use state of the ski holder for waxing and edge trimming provided by an embodiment of the present utility model.

When the ski 1 is placed in the vertical position 111, the fastening member 300 is moved to allow the end face of the fastening member 300 to tightly abut against the ski 1, so that the ski 1 is pressed against the side wall of the vertical position 111, and the fastening member 300 cooperates with the vertical position 111 to limit the ski 1, as shown in FIG. 5. At this time, the movable piece 130 is pushed to the inclined position 112 by the ski, thus not affecting the fixation of the ski 1 in the vertical position.

Figure 6:
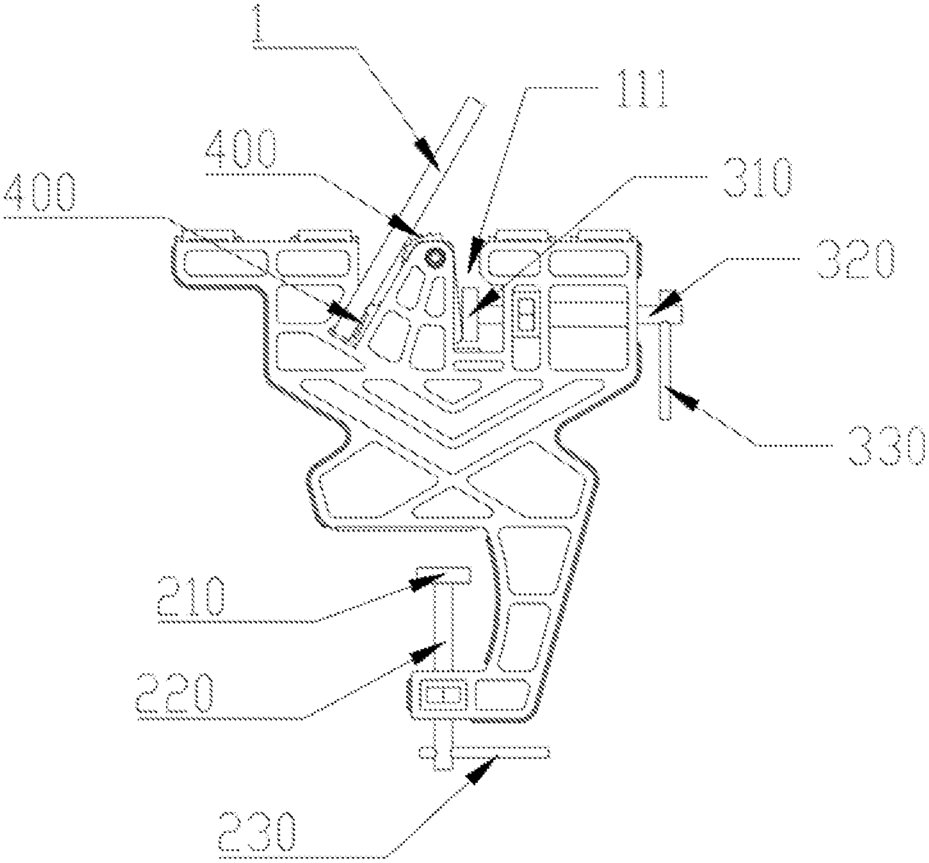
FIG. 6 is a diagram showing another use state of the ski holder for waxing and edge trimming provided by an embodiment of the present utility model.

When the ski 1 needs to be placed obliquely, the ski 1 is placed in the inclined position 112. The fastening member 300 is moved to make the end face of the fastening member 300 closely abut against the cathetus face 131 of the movable piece 130, and the hypotenuse face 132 of the movable piece 130 is exposed at the inclined position 112. The ski 1 is limited by the cooperation of the hypotenuse face 132 of the movable piece 130 and the inclined position 112, as shown in FIG. 6. At this time, the movable piece 130 is partially exposed at the vertical position 111 and partially exposed at the inclined position 112.

It can be understood that, the skis of different thicknesses will cause the movable piece 130 to be exposed at the inclined position 112 in different volumes. When the fastening member 300 is perpendicular to the cathetus face 131, the inclination of the hypotenuse face 132 is consistent with that of the inclined position 112. The hypotenuse face 132 is provided with the anti-slip silicone 400, which, on the one hand, can better fix the ski 1, and on the other hand, can adjust and compensate for the difference in inclination by virtue of the elastic force of the anti-slip silicone 400 when the inclination of the hypotenuse face 132 is inconsistent with the inclination of the inclined position 112 to protect the surface of the ski 1.

Referring to FIG. 6, the fastening member 300 includes a fastening screw 320 passing through the holder body 1 and exposed at the vertical position 111, a fastening abutting joint 310 located at the end of the fastening screw 320 facing the placement position 111, and a rotating handle 330 located at the end of the fastening screw 320 away from the vertical position 111. The end of the fastening abutting joint 310 away from the rotating handle 330 is flat. Preferably, the end of the fastening abutting joint 310 away from the rotating handle 330 is provided with the anti-slip silicone 400. In the present embodiment, the side of the vertical position 111 away from the inclined position 112 is further provided with a recessed position 113 for receiving the fastening abutting joint 310 of the fastening member 300, which avoids obstruction caused by the fastening abutting joint 310 to the ski 1 being placed in the vertical position 111.

The fixing position 120 is formed by a side edge of the holder body 100 concaving inwardly. The fixing member 200 includes a fixing screw 220 passing through the holder body 100 and exposed at the fixing position 120, a fixing abutting joint 210 located at one end of the fixing screw 220 facing the fixing position 120, and a fixing handle 230 located at the other end of the fixing screw 220. The end of the fixing abutting joint 210 away from the fixing handle 230 is flat. Preferably, the end of the fixing abutting joint 210 away from the fixing handle 230 is provided with the anti-slip silicone 400. When in use, the desktop is clamped into the fixing position 120, the fixing handle 230 is rotated to drive the fixing screw 220 to move relative to the holder body 100 to allow the fixing abutting joint 210 to closely abut against the desktop. The desktop is clamped tightly by the side wall of the fixing position 120 and the fixing abutting joint 210, so that the holder body 100 is fixed to the desktop.

In the ski holder of the present utility model, the movable piece is movably arranged between adjacent placement positions, so that the ski in any placement position can be fixed through the short-stroke movement of the fastening member, thereby realizing quick fastening of the ski. The ski holder of the present utility model provides three placement modes of vertical placement, inclined placement, and horizontal placement, which is more convenient for daily maintenance and repair of the ski.

The above description shows and describes the preferred embodiments of the present utility model. It should be understood that the present utility model is not limited to the form disclosed herein and should not be regarded as the exclusion of other embodiments. Instead, the present utility model can be used in various other combinations, modifications, and environments, and can be modified within the scope of the concept of the present utility model based on the above teachings or skills or knowledges in the relevant field. Modifications and changes made by those skilled in the art, as long as not departing from the spirit and scope of the present utility model, shall fall within the protection scope of the appended claims of the present utility model.

The invention claimed is:

1. A ski holder for waxing and edge trimming, comprising:

a holder body, wherein the holder body is provided with placement positions for placing a ski and a fixing position for fixing the holder body; the holder body further comprises a movable piece, the movable piece is arranged between adjacent placement positions, and the movable piece can move toward the placement positions on both sides thereof;

a fixing member, wherein one end of the fixing member passes through the holder body and is exposed at the fixing position, and the fixing member is moved to cooperate with the fixing position to fix the holder body; and a fastening member, wherein one end of the fastening member passes through the holder body and is exposed at the first placement position, and the fastening member is moved to cooperate with the placement position to fasten the ski;

wherein the placement positions each are a clamping groove formed on the holder body by an upper end face of the holder body facing downward;

wherein two placement positions are provided, comprising a vertical position and an inclined position, and one end of the fixing member is exposed at the vertical position.

2. The ski holder for waxing and edge trimming according to claim 1, wherein the movable piece is movably arranged on the holder body through a rotating shaft, or, the movable piece is slidably arranged on the holder body.

3. The ski holder for waxing and edge trimming according to claim 2, wherein two placement positions are provided, and a cross section of the movable piece along a moving direction of the fastening member is a right-angled triangle with a hypotenuse facing the inclined position.

4. The ski holder for waxing and edge trimming according to claim 1, wherein an upper end face of the holder body is flat.

5. The ski holder for waxing and edge trimming according to claim 4, wherein the upper end face of the holder body is provided with an anti-slip silicone or an anti-slip rubber.

6. The ski holder for waxing and edge trimming according to claim 1, wherein the fixing position is formed by a side edge of the holder body concaving inwardly.

7. The ski holder for waxing and edge trimming according to claim 6, wherein the fixing member comprises a fixing screw passing through the holder body and exposed at the fixing position, a fixing abutting joint located at one end of the fixing screw facing the fixing position, and a fixing handle located at the other end of the fixing screw; an end of the fixing abutting joint away from the fixing handle is flat.

8. The ski holder for waxing and edge trimming according to claim 1, wherein the fastening member comprises a fastening screw passing through the holder body and exposed at the first placement position, a fastening abutting joint located at an end of the fastening screw facing the placement position, and a rotating handle located at an end of the fastening screw away from the placement position; an end of the fastening abutting joint away from the rotating handle is flat.

* * * * *